(12) United States Patent
Hurst-Hiller et al.

(10) Patent No.: US 7,937,340 B2
(45) Date of Patent: May 3, 2011

(54) AUTOMATED SATISFACTION MEASUREMENT FOR WEB SEARCH

(75) Inventors: Oliver Hurst-Hiller, Seattle, WA (US); Eric Watson, Redmond, WA (US); Susan T. Dumais, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 241 days.

(21) Appl. No.: 10/806,271

(22) Filed: Mar. 22, 2004

(65) Prior Publication Data

US 2005/0125390 A1   Jun. 9, 2005

Related U.S. Application Data

(63) Continuation-in-part of application No. 10/727,444, filed on Dec. 3, 2003, now Pat. No. 7,363,282.

(51) Int. Cl.
*G06F 15/18* (2006.01)

(52) U.S. Cl. ............... 706/14; 706/12; 706/18; 706/45; 706/46; 706/52; 706/62; 715/700; 715/701; 715/745; 715/789; 707/705; 707/706; 707/707; 707/722; 707/723; 707/732

(58) Field of Classification Search .......... 706/1, 10–21; 709/201, 227, 203; 715/700, 701, 745, 789, 715/780, 811; 707/3, 5, 6, 1, 10
See application file for complete search history.

(56) References Cited

U.S. PATENT DOCUMENTS

| | | | |
|---|---|---|---|
| 5,724,567 A * | 3/1998 | Rose et al. ............... 707/2 |
| 6,438,579 B1 * | 8/2002 | Hosken ............... 709/203 |
| 6,526,440 B1 | 2/2003 | Bharat ............... 709/219 |
| 6,529,903 B2 | 3/2003 | Smith et al. ............... 707/7 |
| 6,571,606 B2 | 6/2003 | Fleury et al. | |
| 6,615,209 B1 | 9/2003 | Gomes et al. ............... 707/5 |
| 6,658,423 B1 | 12/2003 | Pugh et al. ............... 707/102 |
| 6,678,681 B1 | 1/2004 | Brin ............... 707/6 |
| 6,751,606 B1 * | 6/2004 | Fries et al. ............... 707/3 |
| 6,801,902 B1 | 10/2004 | David | |
| 6,801,909 B2 | 10/2004 | Delgado et al. | |
| 6,853,998 B2 | 2/2005 | Biebesheimer et al. | |
| 2001/0039563 A1 * | 11/2001 | Tian ............... 709/202 |
| 2002/0123988 A1 | 9/2002 | Dean et al. ............... 707/3 |
| 2002/0133481 A1 | 9/2002 | Smith et al. ............... 707/3 |
| 2002/0152190 A1 * | 10/2002 | Biebesheimer et al. ......... 707/1 |

(Continued)

OTHER PUBLICATIONS

Brin, S. et al., "The Anatomy of a Large-Scale Hypertextual Web Search Engine", *The Anatomy of a Search Engine*, Aug. 7, 2000, Error! Hyperlink reference not valid., 18 pages.

(Continued)

*Primary Examiner* — David R Vincent
*Assistant Examiner* — Omar F Fernandez Rivas
(74) *Attorney, Agent, or Firm* — Woodcock Washburn LLP (57) ABSTRACT

Context-based user behavior data is collected from a search mechanism. This data includes, for a given query, user feedback (implicit and explicit) on the query and context information on the query. A predictive pattern is applied to the context-based user behavior data in order to produce predicted user satisfaction data. Data mining techniques may be used to create and improve one or more predictive patterns. Predicted user satisfaction data can be used to monitor or improve search mechanism performance, via a display reporting the performance or identification of any queries with a shared characteristic and sub-par user satisfaction. A dynamically-improving search mechanism uses the predicted user satisfaction data to improve the performance of the search mechanism.

19 Claims, 6 Drawing Sheets

U.S. PATENT DOCUMENTS

2003/0018626 A1*  1/2003  Kay et al. .......................... 707/3
2003/0130983 A1*  7/2003  Rebane ............................. 707/1
2004/0054661 A1*  3/2004  Cheung et al. .................... 707/3
2004/0111397 A1*  6/2004  Chen et al. ....................... 707/3

OTHER PUBLICATIONS

Claypool, M. et al., "Inferring User Interest", *IEEE Internet Computing*, 2001, 5(6), 32-39.

Gamma, E. et al, "Gang of Four", *Design Patterns: Elements of Reusable Object-Oriented Software*, 1994.

Brin, S. et al., "The Anatomy of a Large-Scale Hypertextual Web Search Engine", *The Anatomy of a Search Engine*, Aug. 7, 2000, 18 pages, Retrieved from the Internet.

Gamma, E. et al, "Gang of Four", *Design Patterns: Elements of Reusable Object-Oriented Software*, 1994, Contents vii-ix.

U.S. Appl. No. 10/727,444, Non-Final Rejection dated Dec. 3, 2003, 11 pages.

Kicklighter, "State Machine", http://searchiomidmarket.techtarget.com/sDefinition/0,,sid183__ gci214244,00.html, SearchCio-MidMarket.com—Search Definitions, last updated May 18, 2004, Accessed on Sep. 28, 2010, 3 pages.

* cited by examiner

AUTOMATED SATISFACTION MEASUREMENT FOR WEB SEARCH

CROSS-REFERENCE TO RELATED APPLICATIONS

This application is a continuation-in-part of U.S. patent application Ser. No. 10/727,444, filed Dec. 3, 2003, now U.S. Pat. No. 7,363,282 entitled "Search System Using User Behavior Data".

FIELD OF THE INVENTION

This invention relates in general to the field of data search and retrieval. More particularly, this invention relates to the collection and use of user data for search result evaluation.

BACKGROUND OF THE INVENTION

Data on one or more computer systems may contain data useful for a user. However, the data may be too large for the user to find the data by direct examination. Additionally, some parts of the data repository may contain information that is not accessible to the user. In many cases, in order to allow the user useful access to the data, a search mechanism is provided. The search mechanism allows a user to issue a search request (also termed a search query). The results are then returned for the user.

For example, a web-based search engine is a search mechanism which may be used to provide search access to information via a web-based search. The information may be a specific data repository, such as a database or other data collection. The information may also be an agglomeration of a number of different data repositories. Such a search engine may provide search access to information available from different information providers over a network, such as the Internet.

In a typical usage of a web search engine, the user enters a query, which is a set of search terms related to what the user is looking for. The query is transmitted to the search engine, which attempts to locate "hits"—i.e., content that is available on the Internet and that relates to the terms contained in the query. Generally, the search engine either has a database of web pages that are known to exist, or communicates with external "providers" who maintain such databases; the query is "scored" against items in these databases to identify the content that best match the query. A list of results is then generated, and these results are returned to the user's computer for display by the user's web browser.

Typically, the search results contain information such as: the Uniform Resource Locators (URLs) of web pages, the titles of the pages, descriptions of the pages, and possibly other textual or graphical information about the web pages. The user then reads the results and attempts to determine, based on the description contained in the results, whether the results correspond to what the user is looking for. Users may then attempt to retrieve the entire page correlating to a search result. In other contexts, search engines present results summarizing the pieces of data which may be useful for a user.

The utility of the search engine is directly correlated to the quality of the results provided. In the best case, results are presented to the user in order of utility to the user. Because the quality of the results is subjective, the user's satisfaction must be determined in order to determine whether the results were satisfactory.

Generally, search engines in the prior art use non-scalable methods for evaluating the quality of search results. As an example, a human reviewer may examine a record of a search and the search results to determine whether the search results are satisfactory. However, this presents at least three major problems. First, as noted, this method is non-scalable with respect to the number of judgments provided for individual queries. While 300 results may be judged by a reviewer, it is hard to generalize the satisfactoriness of 300 judged results to over 3,000,000 results.

Second, the method is non-scalable with respect to the number of unique queries that can be judged. A search engine may perform in an unsatisfactory way on searches of a specific type or with a given characteristic. If only a small subset of the all searches performed are judged, such a problem may be difficult to diagnose. A number of queries of the certain type for which the search results are not satisfactory may be needed in order to recognize or diagnose a problem; otherwise a few queries for which search results are unsatisfactory may appear only as outliers. Thus, where only a small number of queries judged, a sufficient accumulation of such unsatisfactory queries may never be gathered.

A last problem is that the opinion of judges on user satisfaction may not be equivalent to the opinion of actual users on their satisfaction. The population of judges may be a different population than the target population of users. Thus, substituting the opinion of judges for the opinion of actual users may not result in a correct assessment of satisfaction.

In the prior art, the quality of search results has been evaluated by asking users to provide feedback about the appropriateness of one or more results in an interactive fashion, so called relevance feedback techniques. Gerard Salton and Chris Buckley. "Improving information retrieval performance by relevance feedback", *Journal of the American Society for Information Science,* 1990, 288-297. Relevance feedback techniques require that users explicitly provide feedback, for example, by marking results as to their degree of relevance, by selecting keywords to add to the query, or by answering follow-up questions about their search intent. User feedback data is then typically used to automatically modify the user's query, thus initiating a new search and a new list of search results. Explicit feedback is typically collected on limited scale. Users need to opt-in to providing feedback, so the sample of users is biased. In addition, explicit feedback techniques require that users engage in activities beyond their intended searching behavior, and this may influence the search outcome. Finally, since the costs to the user are high, and the benefits not immediately obvious, it can be difficult to collect data in a reliable fashion from a large, representative sample of users.

In the prior art, quality of individual web pages has been measured by obtaining explicit feedback from a user. At least one prior art web browser has attempted to obtain such explicit feedback from a user. This browser is described in a paper entitled "Inferring User Interest" by Mark Claypool, David Brown, Phong Le, Makoto Waseda in *IEEE Internet Computing* 5(6): 32-39 (2001). In this browser, different pages are displayed by the browser. Whenever the page being displayed by the browser is changed, a user evaluation of the page is requested from the user. User evaluations for a given page are collected, to determine whether users find that page valuable. In this browser, some implicit feedback is also maintained regarding each page, including data regarding the time spent on the page, mouse movements, mouse clicks, and scrolling time.

While this technique does gather user feedback, it has limited utility in situations in which users may have different needs for a page. For example, a user who is looking for information about books written by Douglas Adams may evaluate a page on his book *The Hitchhiker's Guide to the Galaxy* and give a high score for utility. However, another user who is looking for information on books about traveling cheaply may evaluate the same page and give it a low score. Thus the technique described will have limited utility in the wide variety of situations in which different users may have different needs, or even where a single user may have different needs for information at different times. In other words, the usefulness of this technique is limited because evaluation of each page is completely independent of the context in which the user arrived at the page.

Thus, this technique is not useful for evaluating the quality of a search engine. In general, this technique is not useful for evaluations which are context-based, but only for evaluating the quality of individual data items, independent of the context in which a user arrived at the data items.

The gathering of context-based user feedback has been accomplished for searches performed on a search mechanism. The search mechanism is monitored for user behavior data regarding an interaction of a user with the search mechanism. The response data provided by the search mechanism is also monitored. Context data (describing the search) and user feedback data (the user's feedback on the search—either explicit or implicit) are stored. However, while such data has been gathered, the raw data does not contain explicit user satisfaction data which can replace the judged user satisfaction data from a reviewer, which judged data suffers from the drawbacks described above.

In view of the foregoing, there is a need for a system and method that overcomes the drawbacks of the prior art.

SUMMARY OF THE INVENTION

The satisfaction of users with a search mechanism is determined. Context-based user behavior data on searches performed is collected. The context-based user behavior data consists of feedback data and context data. The feedback data can be explicit, for example, feedback collected from a web browser or plug in which requests that a user provide feedback on a search performed. The feedback can also be implicit, based on the users actions (or inaction) when the search results are presented. Context-based user behavior data also consists of context data. Context data is data describing the query, the search results, and/or any other state of the search mechanism.

A predictive pattern is a model which predicts user satisfaction given such feedback and context data. One or more predictive patterns are used on the context-based user behavior data to determine whether the search mechanism is providing satisfactory results for queries or not. This predicted user satisfaction data provides a scalable method for surveying user satisfaction over the entire user base of a search engine. Where explicit feedback is available, through data mining techniques, user satisfaction as given by the predictive pattern may be calibrated against reported explicit feedback on user satisfaction.

Data on predicted user satisfaction may be displayed, for example in a user-consumable macro summary, such as a search mechanism management toolbar which displays historical predicted user satisfaction data.

The predicted user satisfaction data may also be used to isolate groups of queries which should be examined for a possible problem with the search mechanism. For example, a group of queries with one or more related characteristics may be examined to see if the predicted user satisfaction is lower for the group than for the rest of the queries being performed. If so, an analysis may allow the search engine to be improved.

In addition, where repeating queries or similar queries are presented multiple times with different contexts, such as a different search result order being presented to the user, it can be determined that one such different search result order is preferable to another. Thus, the search engine can use the predicted user satisfaction data to dynamically improve the quality of search results over time.

Other features of the invention are described below.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Predicted user satisfaction data is produced through application of one or more predictive patterns which predicts user satisfaction based on context-based user behavior data. The predictive pattern is applied to collected context-based user behavior data. Data mining techniques may be used to refine and improve the predictive pattern.

Predicted user satisfaction data can then be used to monitor or improve search mechanism performance. A report may be displayed with the predicted user satisfaction data. Problems with the search mechanism may be identified and corrected. Additionally, a dynamically-improving search mechanism may be provided which uses historical predicted user satisfaction data to dynamically improve the search mechanism's user satisfaction.

Exemplary Computing Arrangement

Figure 1:
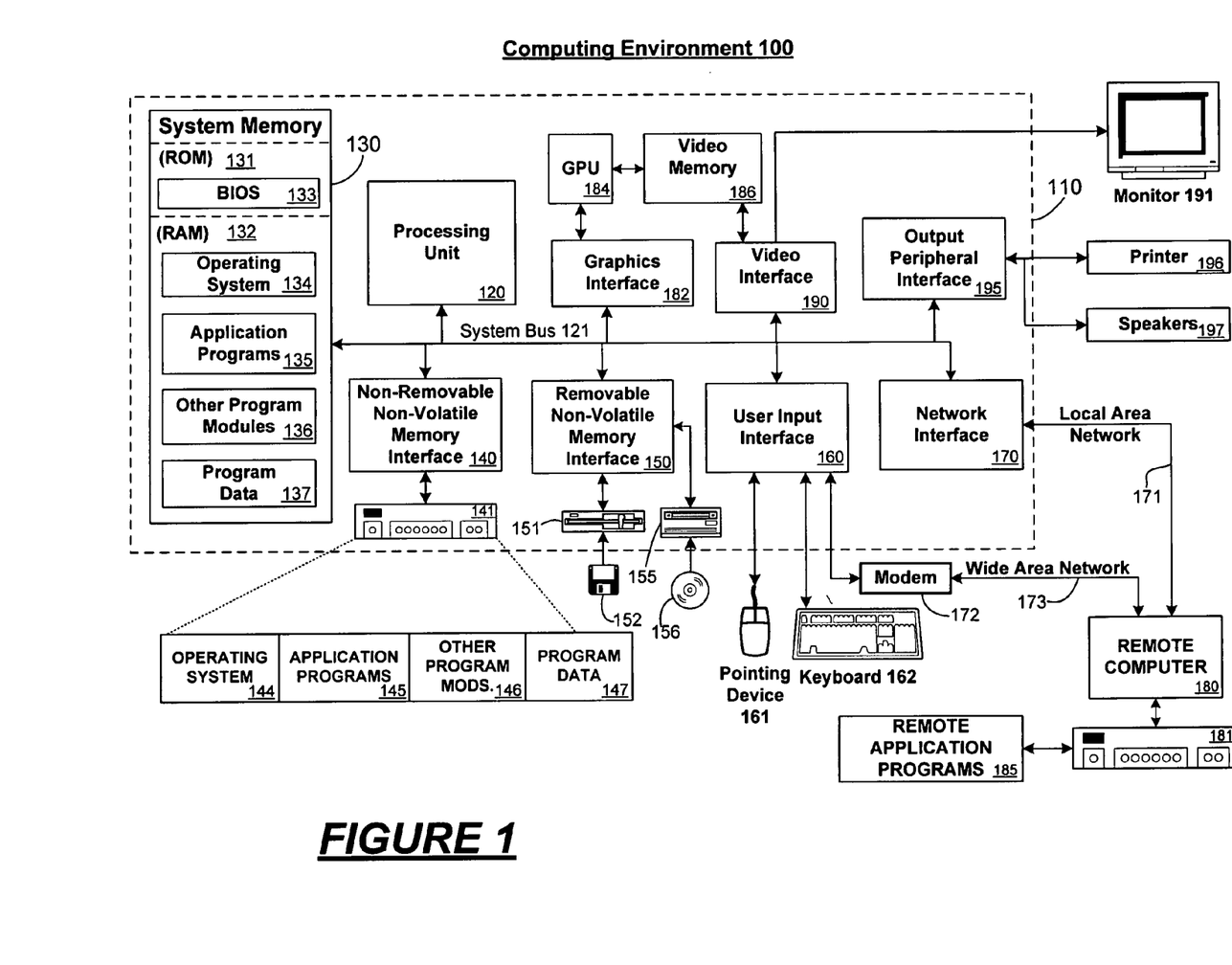
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those implemented on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Automated Satisfaction Measurement

Figure 2:
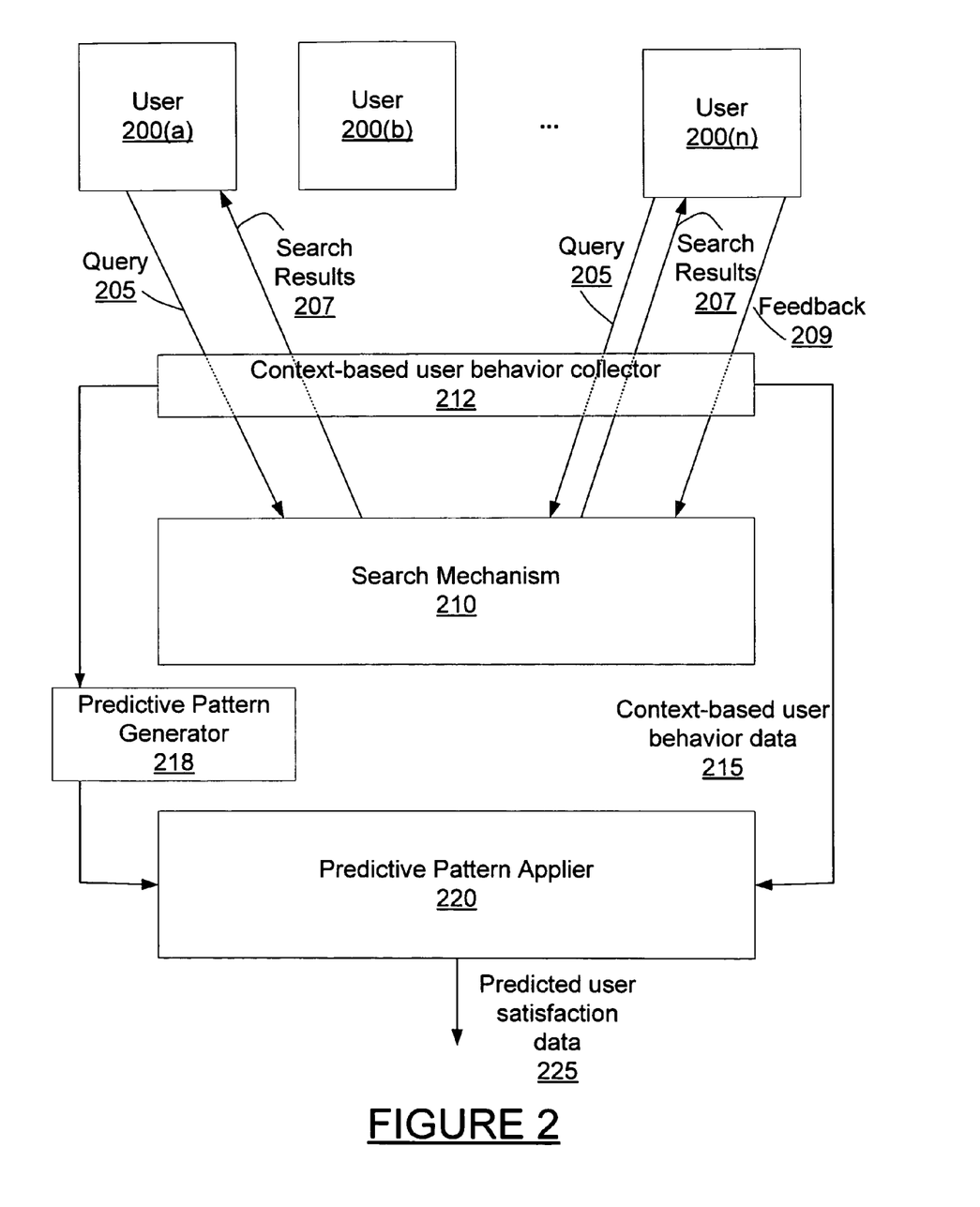
FIG. 2 is a block diagram of the system according to one embodiment of the invention.

FIG. 2 is a block diagram of the system according to one embodiment of the invention. As shown in FIG. 2, users 200 interact with search mechanism 210. While a web browser which presents web pages as results will be used in describing the invention herein, any search mechanism is contemplated, and the results retrieved may comprise any kind of search result, not just traditional web search results. Additionally, while queries on a search mechanism will be used in describing the invention, the queries do not need to be explicit queries, but may be any user activity which triggers a search. For example, web browsing on a website may cause related documents to be searched for and presented to a user, even if the user has not explicitly requested the documents. Such implicit queries may also be used according to the methods and systems of the invention.

The interaction with the search mechanism 210 may take place in any of a variety of ways. For example, users 200 may interact with the search mechanism 210 via web browsers which communicate with search mechanism 210 over the Internet. Users utilize the search mechanism 210 by sending queries 205 to the search mechanism and receiving search results 207 from the search mechanism 210. In addition, in one embodiment some or all users such as user 200(n) may be requested to provide explicit feedback 209 regarding the user's satisfaction with a query.

Context-based user behavior data 215 is collected by a context-based user behavior collector 212. In one embodiment, this context-based user behavior collector is client-side plugin or other functionality which is integrated into search mechanism 210. In another embodiment, the functionality of collecting context-based user behavior is handled in part by a separate collector and in part by functionality integrated into search mechanism 210. The context-based user behavior data 215 is provided to a predictive pattern applier 220. The context-based user behavior data 215 include consists of implicit and explicit feedback data.

Implicit Feedback

Implicit feedback is feedback not provided explicitly by a user 200, but provided implicitly through the user 200's actions or inactions. For example, if the user 200, upon receipt of a search result, navigates to and prints one of the results from the search result, then this is probably indicative that the user was satisfied with that result. Of course, such an indication may be wrong or misleading. If a user 200 is searching for an element of information and the search does not find that element of information, but does find another element of information which the user finds interesting or important, the user 200 may still be dissatisfied with the search. Despite these limitations, however, the information regarding a user's actions is implicit feedback which can be used to determine user satisfaction in a probabilistic manner.

In one embodiment, implicit data is collected by context-based user behavior collector 212. As shown in FIG. 2, in one embodiment a collector 212 may be an application or other monitor which collects information regarding the interaction between a user 200 and the search mechanism 210. In another embodiment, collection of user behavior data is accomplished by a helper object inside search mechanism 210. This collector 212 or helper object detects the search mechanism's typical events. The implicit data collected may be specific to the search mechanism 210. For example, the search mechanism 210 may be a browser. In certain browsers, events occur (are "fired") when certain situations occur. The detection of the event can signal that certain situations have occurred in the browser. For example, such events may include events which indicate the user's navigation from page to page, such as: (1) an event which fires when a hyperlink has been clicked to navigate to a different page; (2) an event which fires when the history is used for navigation to a different page; (3) an event which fires when the address bar is used to navigate to a different page; and/or (4) an event which fires when the favorites list is used to navigate to a different page.

Additionally, such events may be include events which indicate the user's use of a displayed page, such as: (5) an event which fires when a document has been completely loaded and initialized (6) an event which fires when scrolling is taking place; (7) an event which fires when a document is printed; (8) an event which fires when a document is added to the favorites list; (9) an event which fires when the window gains focus; (10) an event which fires when the window loses focus; (11) an event which fires when a window has been closed; and/or (12) an event which fires when the user selects, cuts, or pasts portions of the displayed page. Other events may also exist and may be detected by the helper object. Navigation back to the search results page is one of these events. Some of these events may not be available in some search mechanisms 210, and some search mechanisms 210 may require modification in order to provide functionality for detection of these events where the behavior collection is provided within the search mechanism 210. The collection and aggregation of implicit data regarding a single user may also yield, in combination, information about user dwell time, about a new query initiated by the same user, or about other sequences of user behaviors.

In addition to notification of the occurrence of the corresponding activity in the browser, these events in some cases also include information about the activity. For example, when a hyperlink has been clicked the element which has been clicked is sent as a parameter in the event. Characteristics of the element (such as the position of the element in the results, the size of content in the element, the type of content in the element) can be sent as additional parameters.

In addition to detecting events which signal the user's pattern of navigation and the user's use of a displayed page, a context-based user behavior collector or integrated helper object can also access the search mechanism 210's menu and toolbar (if the search mechanism 210 includes these) and install hooks to monitor messages and actions which are not reflected in events. In one embodiment, these hooks are used instead of the use of events as detailed above.

Explicit Feedback Data

In addition to implicit feedback data, a user 200 may provide explicit feedback 209. Explicit feedback 209 is the user 200's explicit judgment of that user 200's satisfaction with the query the user 200 submitted. For example, regarding a search, a query, or a specific result, the user 200 may be asked, via a dialog box, "Did this answer your question?" and allowed to enter a response. As another example, regarding a specific result which the user ignored, the user 200 may be asked "Why didn't you try this result?" and given choices including "I didn't think this would answer my question."

In one embodiment, some or all of the users 200 are requested to provide explicit feedback 209 with respect to some or all searches, and such explicit feedback 209 is included as part of the context-based user behavior data 215.

Context Data

In addition to user feedback data, context data is regarding the query is also used. Context data and user feedback data (both explicit and implicit) is incorporated into the context-based user behavior data 215. Generally, context data allows user feedback data to be analyzed in the context of what was occurring leading to the feedback. This data allows user feedback to be associated with the query 205 and the search mechanism 210's responses to the query 205. In one embodiment, context data can include data such as: the query 205, the search response 207, and any other related information regarding the query. As an example of related information, where users 200 are communicating with search mechanism 210 via the Internet, the user 200's ISP (Internet service provider) address may be stored. Thus, if the users 200 connecting from a specific ISP have lower satisfaction, or if users connecting from ISPs from a specific country or world location have lower satisfaction, the predicted user satisfaction data for such countries can be isolated.

Additionally, context data may include data regarding previous uses of the search mechanism 210. For example, some search mechanisms 210 may include a feature which suggests a second search when a first search has found no results, or where a search is misspelled. This second search may be considered part of the same query, or may be considered a related query. If it is considered a related query, that fact may be recorded as part of the context data of either or both of the first query and the second query.

Predictive Pattern Applier 220

The predictive pattern applier 220 applies one or more predictive patterns to the context-based user behavior data to produce predicted user satisfaction data 225. The predictive pattern uses the feedback data and the context data to determine whether the search was satisfactory. For example, if a result is printed, the predictive pattern may use that fact as an indication that the user was satisfied. If a result was clicked and then a delay occurred indicating that the user is reviewing the result, the predictive pattern may use that fact as an indication that the user was satisfied. The predictive pattern may be multi-factor, so if a factor indicating complete satisfaction appears with a factor indicating low satisfaction, a medium level of satisfaction is reported in predicted user satisfaction data for that query in one embodiment.

In one embodiment, predictive patterns are generated by predictive pattern generator 218. This predictive pattern generator 218 receives the context-based user behavior data 215 and determines predictive patterns which may be used for generating predicted user satisfaction data 225.

In one embodiment, the predictive pattern applier 220 may be part of a data mining system. In other embodiments, the predictive pattern applier 218 may be part of a data mining system. Data mining, generally, is the process of uncovering trends, patterns, and relationships from accumulated data. Data mining (sometimes termed "knowledge discovery") allows the use of stored data by examining the data for patterns. The most common data-mining techniques are Bayesian networks, classification methods (such as support vector machines, decision trees, neural networks, language models), cluster analysis, and regression. Because certain queries occur only with low frequency, according to one embodiment of the invention, the grouping of a number of one kind of low frequency queries may be grouped in order to determine whether a statistically significant trend exists. Data mining may be used to analyze such groupings of low frequency queries.

Thus, the predictive pattern may be generated or improved via data mining. For example, a RVT (relevance verification test) may be used to evaluate a predictive pattern. In a RVT, a pre-judged set of results is run through the search mechanism 210. The predictive pattern is applied to the context-based user behavior data for this pre-judged set of results. The resulting predicted user satisfaction data 225 from the predictive pattern is compared to the judged satisfaction for the pre-judged set of results. If the predictive pattern is successful at determining a predicted user satisfaction corresponding to the pre-judged user satisfaction, then the predictive pattern is judged to be good. Data mining may also be used to improve the predictive pattern given such a pre-judged set of results, for example by generating a predictive pattern using a portion of the pre-judged set of results, and testing it using the remaining results from the pre-judged set. In addition, if explicit feedback 209 is being received from users 200, then that explicit feedback can be used to determine the success of the predictive pattern at predicting user satisfaction, or to improve the predictive pattern or produce a new one, according to data mining techniques.

Use of Predicted User Satisfaction Data 225

Figure 3:
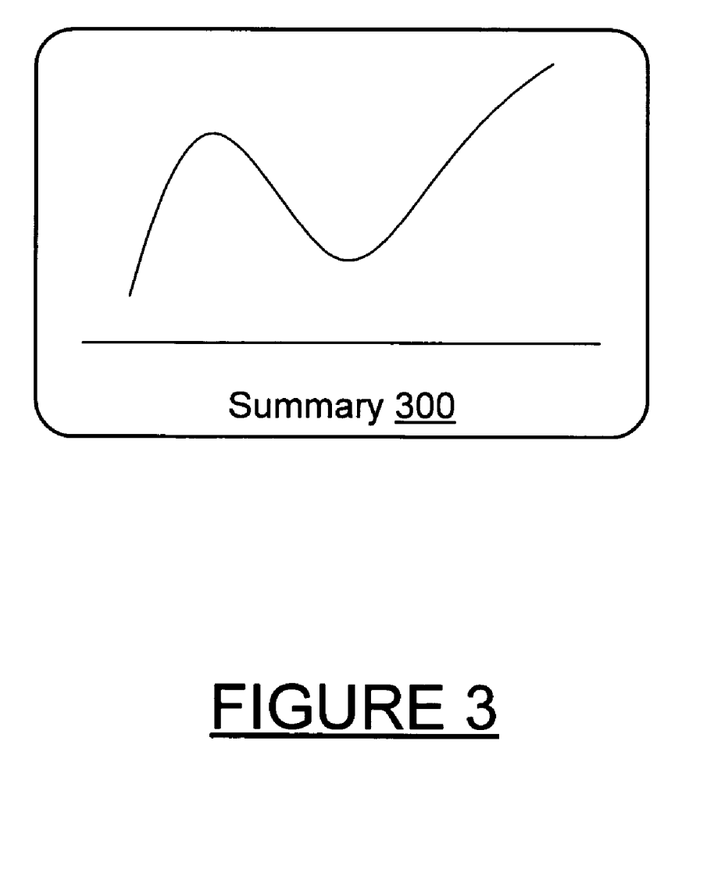
FIG. 3 is a block diagram of an example summary according to one embodiment of the invention.

The predicted user satisfaction data 225 which is produced by the predictive pattern applier 220 can be used to monitor the search mechanism 210. For example, a summary may be provided for a search developer or analyst. FIG. 3 is a block diagram of an example summary according to one embodiment of the invention. A summary 300 shows the measured satisfaction over time. The summary may show events, such as the implementation of a new version of a search mechanism 210 or other events which affect user satisfaction with search mechanism 210.

Additionally, in one embodiment, predicted user satisfaction data 225 is used to isolate problematic queries. For example, a number of groups of queries with specific characteristics, such as context characteristics (e.g. all queries from a specific country, all queries in a specific language, all queries for a specific term) are be examined to see if any group of queries with a specific characteristic or set of characteristics suffers from a lower user satisfaction than queries do in general. Such groupings are used to isolate problematic queries for search mechanism 210. When a grouping is isolated, it is reported to a developer for search mechanism 210. This allows the identification of problems which appear only sporadically over a large number of users or queries. The predicted user satisfaction data can also be used to verify that a fix has been successful for such a problem.

Figure 4:
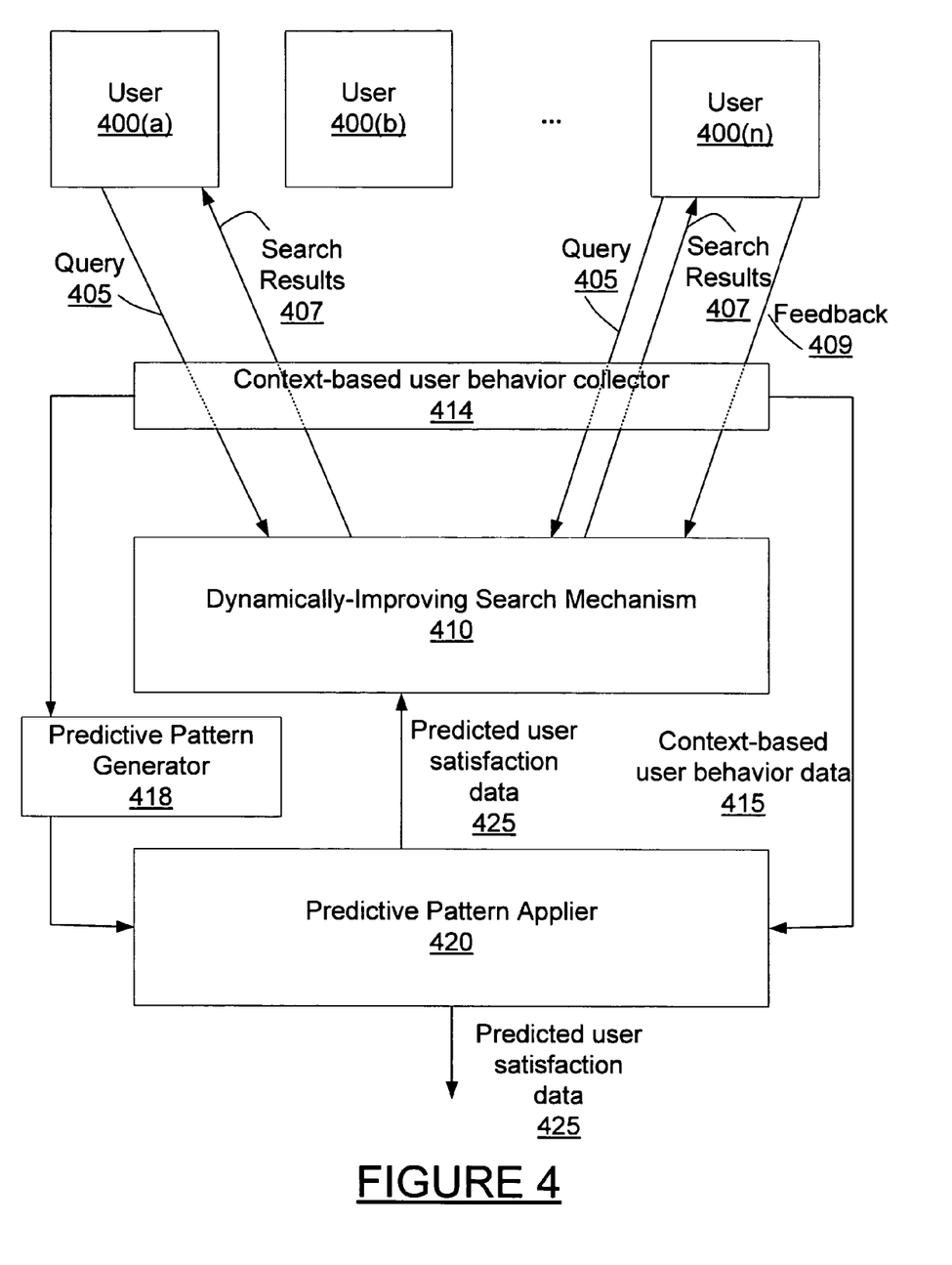
FIG. 4 is a block diagram of a dynamically-improving search mechanism.

In another embodiment, predicted user satisfaction data is used to produce a dynamically-improving search mechanism. FIG. 4 is a block diagram of a dynamically-improving search mechanism. As shown in FIG. 4, users 400 interact with dynamically-improving search mechanism 410. This interaction may take place in any of a variety of ways. As before, users 400 utilize the dynamically-improving search mechanism 410 by sending queries 405 to the search mechanism and receiving search results 407 from the dynamically-improving search mechanism 410. In addition, in one embodiment some or all users such as user 400(n) may be requested to provide explicit feedback 409 regarding the user's satisfaction with a query. Context-based user behavior data 415 is collected by a context-based user behavior collector 412 and provided to a predictive pattern applier 420. In another embodiment, such collection functionality is incorporated into the dynamically-improving search mechanism 410. The predictive pattern applier 420, in one embodiment is a data mining apparatus which uses the techniques of data mining to apply one or more predictive patterns. In one embodiment, these predictive patterns are generated by predictive pattern generator 418. The predictive pattern applier 420 provides predicted user satisfaction data 425 to the dynamically-improving search mechanism 410.

The dynamically-improving search mechanism 410 uses the predicted user satisfaction data 425 in order to improve its performance. For example, the predicted user satisfaction data 425 may indicate that, of two different presentations of search results, one of the presentations results in higher predicted user satisfaction. The dynamically-improving search mechanism adjusts to provide the better presentation for search results more often, thus improving predicted user satisfaction for the future. Other refinements may occur using this same mechanism. In addition to providing different presentations of search results (such as different orderings of results on a results page), spell-correction, query refinement suggestions, news or shopping results, or categorization user interface may be provided to the user in different situations. The dynamically-improving search mechanism 410 can be used to compare the user satisfaction with these solutions or features.

Methods

Figure 5:
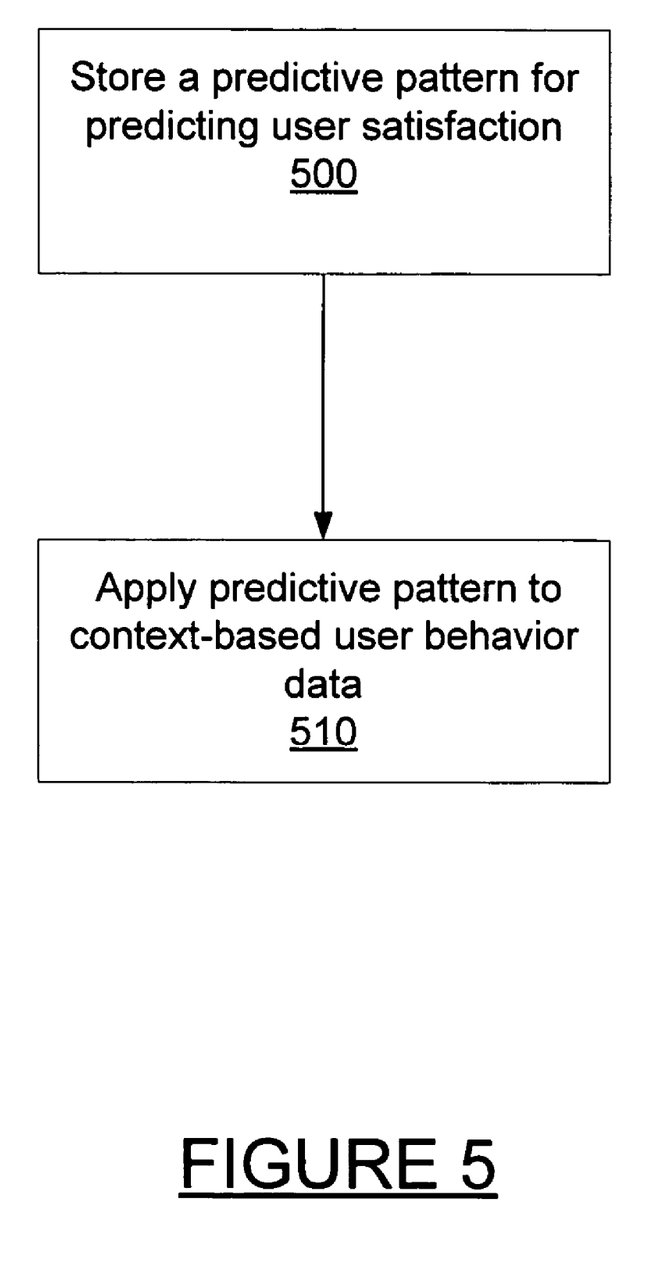
FIG. 5 is a flow diagram of a method according to one embodiment of the present invention.

FIG. 5 is a flow diagram of a method according to one embodiment of the present invention. In FIG. 5, predicted user satisfaction data regarding the performance of a search mechanism which provides search results in response to user queries is obtained by first, in step 500, storing at least one predictive pattern for predicting user satisfaction. In step 510, the predictive pattern is applied to context-based user behavior data regarding certain queries, to predict user satisfaction with these queries.

Figure 6:
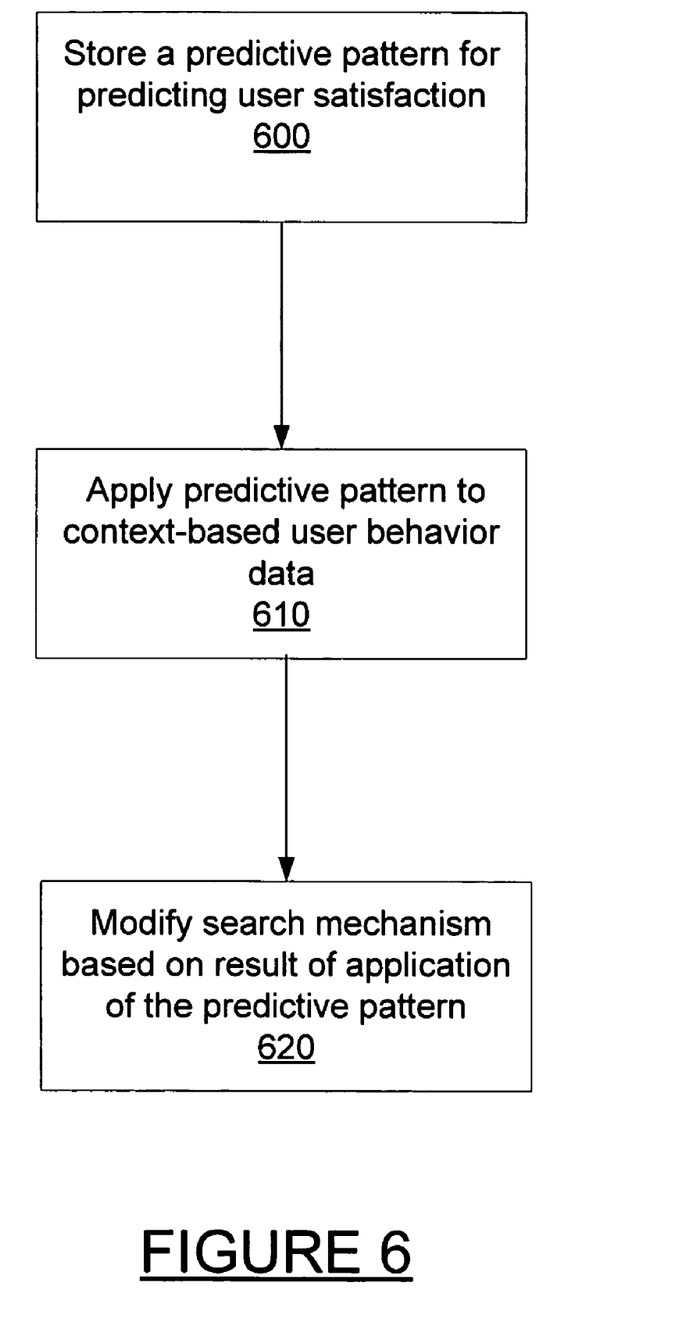
FIG. 6 is a flow diagram of a method according to one embodiment of the present invention.

FIG. 6 is a flow diagram of a method according to one embodiment of the present invention. In FIG. 6, predicted user satisfaction data regarding the performance of a search mechanism which provides search results in response to user queries is obtained by first, in step 600, storing at least one predictive pattern for predicting user satisfaction. In step 610, the predictive pattern is applied to context-based user behavior data regarding certain queries performed on a search mechanism, to predict user satisfaction with these queries. In step 620, the search mechanism is modified based on the result of the application of the predictive pattern.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method for obtaining predicted user satisfaction data regarding the performance of a search mechanism for a computer which provides search results in response to user queries, the method comprising:
storing interaction of users with the search results obtained in response to a query;
determining at least one predictive pattern model for predicting user-satisfaction with the search results from the stored interaction of multiple users with the search results to improve the quality of search results, wherein determining at least one predictive pattern model comprises:
running a pre judged set of results through the search mechanism;
applying a candidate predictive pattern to context-based user behavior data for the pre-judged set of results;
comparing resulting predicted user satisfaction data with judged satisfaction for the pre judged set of results; and
if the candidate predictive pattern is successful at determining a predicted user satisfaction corresponding to the pre-judged user satisfaction, selecting the candidate predictive pattern as one of the at least one predictive pattern model;
storing the at least one predictive pattern model; and
applying said predictive pattern model to context-based user behavior data to determine a satisfaction value for the users with queries that indicate the satisfaction of the users with the search results, wherein the context-based user behavior data comprises user feedback data and context data associated with users feedback data, the context-based user behavior data acquired after receipt by users of the search results of said application of said predictive pattern model further comprises isolating a set of said performed queries which are unsatisfactory and which share a common characteristic in order to identify problems which appear for multiple users or queries.

2. The method of claim 1, where said storing at least one predictive pattern model comprises utilizing data mining techniques to determine at least one predictive pattern model for user satisfaction.

3. The method of claim 1, where said context-based user behavior data comprises explicit user feedback data.

4. The method of claim 1, where said context-based user behavior data comprises implicit user feedback data.

5. The method of claim 4, where said context-based user behavior data is selected from the group comprising: user navigation to a new page using a hyperlink; user navigation to a new page using a history list; user navigation to a new page using an address bar; user navigation to a new page using a favorites list; user scrolling behavior; user document printing behavior; user adding a document to said favorites list; user switching focus to a different application; user switching focus back from a different application; user closing a window; user dwell time behavior; user initiation of a new query;

sequences of user behaviors; and user inactivity without switching focus from a window relating to said performed query.

6. The method of claim 1, where said application of said predictive pattern model yields predicted user satisfaction data regarding said search mechanism, and where said method further comprises:
displaying said predicted user satisfaction data.

7. The method of claim 1, where said context-based user behavior data comprises a testing set of context-based user behavior data.

8. The method of claim 1, further comprising isolating problematic queries based on the predicted user satisfaction data.

9. The method of claim 1, further comprising generating a summary of measured satisfaction based on the predicted user satisfaction data.

10. The method of claim 1, further comprising monitoring a search mechanism responsive to the predicted user satisfaction data.

11. A system for obtaining predicted user satisfaction data regarding the performance of a search mechanism for a computer which provides search results in response to user's queries, the system comprising:
storage for storing interaction of users with the search results obtained in response to a query;
a processor for determining at least one predictive pattern model for predicting user satisfaction with the search results from the stored interaction of multiple users with the search results to improve search quality, wherein the at least one predictive pattern model is determined by:
running a pre-judged set of results through the search mechanism;
applying a candidate predictive pattern to context-based user behavior data for the pre judged set of results;
comparing resulting predicted user satisfaction data with judged satisfaction for the pre judged set of results; and
if the candidate predictive pattern is successful at determining a predicted user satisfaction corresponding to the pre judged user satisfaction, selecting the candidate predictive pattern as one of the at least one predictive pattern model;
storage for storing at least one predictive pattern model; and
data mining apparatus for applying said predictive pattern model to context-based user behavior data, said context-based user behavior data comprising user feedback data and context data associated with the user feedback data, the context-based user behavior data acquired after receipt by users of the search results of said application of said predictive pattern model further comprises isolating a set of said performed queries which are unsatisfactory and which share a common characteristic in order to identify problems which appear for multiple users or queries.

12. The system of claim 11, where said predictive pattern model is derived from the use of data mining techniques to determine at least one predictive pattern model for user satisfaction.

13. The system of claim 11, where said context-based user behavior data comprises explicit user feedback data.

14. The system of claim 11, where said context-based user behavior data comprises implicit user feedback data.

15. The system of claim 14, where said context-based user behavior data is selected from the group comprising: user navigation to a new page using a hyperlink; user navigation to a new page using a history list; user navigation to a new page using an address bar; user navigation to a new page using a favorites list; user scrolling behavior; user document printing behavior; user adding a document to said favorites list; user switching focus to a different application; user switching focus back from a different application; user closing a window; user dwell time behavior; user initiating a new query; sequences of user behaviors; and user inactivity without switching focus from a window relating to said performed query.

16. The system of claim 11, where said data mining apparatus produces predicted user satisfaction data regarding said search mechanism, and where said method further comprises:
displaying said predicted user satisfaction data.

17. The system of claim 11, where said data mining apparatus further isolates a set of said performed queries which are unsatisfactory and which share a common characteristic.

18. The system of claim 11, where said context-based user behavior data comprises a testing set of context-based user behavior data.

19. A system for real-time optimization of a search mechanism for a computer which provides search results in response to user queries, comprising:
a processor, comprising:
means for storing satisfaction of users with search results that is determined by an evaluation of the search results by the user;
means for storing interaction of users with the search results obtained in response to a query;
means for determining at least one predictive pattern model for predicting user satisfaction with the search results based on the satisfaction of the user stored in the means for storing and the user interaction stored in the means for storing multiple users interaction to improve search quality, wherein the at least one predictive pattern model is determined by:
running a pre-judged set of results through the search mechanism;
applying a candidate predictive pattern to context-based user behavior data for the pre-judged set of results;
comparing resulting predicted user satisfaction data with judged satisfaction for the pre-judged set of results; and
if the candidate predictive pattern is successful at determining a predicted user satisfaction corresponding to the pre-judged user satisfaction, selecting the candidate predictive pattern as one of the at least one predictive pattern model; means for storing at least one predictive pattern model;
means for applying said predictive pattern model to context-based user behavior data comprising user feedback data and context data associated with user's feedback data, the context-based user behavior data acquired after receipt by a user of the search results of said application of said predictive pattern model further comprises isolating a set of said performed queries which are unsatisfactory and which share a common characteristic in order to identify problems which appear for multiple users or queries; and
means for outputting predicted user satisfaction data which is indicative of a level of satisfaction experienced by users of search results returned by the search mechanism, the outputted predicted user satisfaction data based on the application of said predictive pattern model.

* * * * *

UNITED STATES PATENT AND TRADEMARK OFFICE
CERTIFICATE OF CORRECTION

| | |
|---|---|
| PATENT NO. | : 7,937,340 B2 |
| APPLICATION NO. | : 10/806271 |
| DATED | : May 3, 2011 |
| INVENTOR(S) | : Oliver Hurst-Hiller et al. |

It is certified that error appears in the above-identified patent and that said Letters Patent is hereby corrected as shown below:

In column 12, line 29, in Claim 1, delete "pre judged" and insert -- pre-judged --, therefor.

In column 12, line 24, in Claim 1, delete "pre judged" and insert -- pre-judged --, therefor In column 13, line 35, in Claim 11, delete "pre judged" and insert -- pre-judged --, therefor.

In column 13, line 37, in Claim 11, delete "pre judged" and insert -- pre-judged --, therefor.

In column 13, line 41, in Claim 11, delete "pre judged" and insert -- pre-judged --, therefor.

Signed and Sealed this
Nineteenth Day of July, 2011

David J. Kappos
*Director of the United States Patent and Trademark Office*